United States Patent
Houradou

(10) Patent No.: US 9,371,839 B2
(45) Date of Patent: Jun. 21, 2016

(54) NOSE DOME FOR A TURBOMACHINE BLOWER

(71) Applicant: SNECMA, Paris (FR)

(72) Inventor: Emmanuel Houradou, Cardaillac (FR)

(73) Assignee: SNECMA, Paris (FR)

( * ) Notice: Subject to any disclaimer, the term of this patent is extended or adjusted under 35 U.S.C. 154(b) by 756 days.

(21) Appl. No.: 13/837,528

(22) Filed: Mar. 15, 2013

(65) Prior Publication Data

US 2014/0322026 A1    Oct. 30, 2014

(30) Foreign Application Priority Data

Apr. 19, 2012  (FR) ...................................... 12 53603

(51) Int. Cl.
| | |
|---|---|
| *B63H 1/26* | (2006.01) |
| *B63H 13/00* | (2006.01) |
| *F04D 29/40* | (2006.01) |
| *F02K 3/06* | (2006.01) |
| *F02C 7/04* | (2006.01) |
| *F04D 29/60* | (2006.01) |

(52) U.S. Cl.
CPC ............... *F04D 29/403* (2013.01); *F02C 7/04* (2013.01); *F02K 3/06* (2013.01); *F04D 29/601* (2013.01); *F05B 2250/232* (2013.01); *Y10T 29/53991* (2015.01)

(58) Field of Classification Search
CPC ....... F04D 29/403; F04D 29/601; F02K 3/06; F02C 7/04; Y10T 29/53991; F05D 2250/232
USPC ................................ 416/244 R, 223 A, 245 R
See application file for complete search history.

(56) References Cited

U.S. PATENT DOCUMENTS

| | | | | |
|---|---|---|---|---|
| 2,619,318 | A * | 11/1952 | Franz Schaer | ............ 416/200 R |
| 3,799,693 | A | 3/1974 | Hull | |
| 4,363,604 | A * | 12/1982 | Broberg, Jr. | ............... 416/245 R |
| 4,405,285 | A * | 9/1983 | Surdi | ......................... 416/220 R |
| 5,573,378 | A * | 11/1996 | Barcza | ...................... 416/245 R |
| 8,322,991 | B2 * | 12/2012 | MacFarlane et al. | ......... 416/144 |

FOREIGN PATENT DOCUMENTS

| | | |
|---|---|---|
| EP | 0 311 514 | 4/1989 |
| EP | 2 241 738 | 10/2010 |
| FR | 2 908 827 | 5/2008 |
| FR | 2 943 726 | 10/2010 |

OTHER PUBLICATIONS

French Office Action dated Jan. 31, 2013 for Appln. No. 1253603.

* cited by examiner

*Primary Examiner* — Hoang Nguyen
(74) *Attorney, Agent, or Firm* — Pillsbury Winthrop Shaw Pittman LLP

(57) ABSTRACT

A nose dome for a turbomachine blower that has a conical exterior surface and a base, which dome includes: a plurality of removal mechanism, a plurality of fasteners created by machining the exterior surface, the fasteners including a first, blind borehole that is capable of forming a bearing surface; an orifice that passes through the bearing surface and is capable of accommodating threaded fasteners. The removal mechanisms are created by machining the boreholes in the fasteners in a direction designed to enable removal in an axial direction of the dome with the aid of a tool that cooperates with the machined arrangements.

6 Claims, 2 Drawing Sheets

NOSE DOME FOR A TURBOMACHINE BLOWER

CROSS REFERENCE TO RELATED APPLICATIONS

This application claims priority to French Patent Application No. 1253603, file Apr. 19, 2012, the entire contents of this application are incorporated herein by reference in their entireties.

TECHNICAL FIELD OF THE INVENTION

The technical field of the invention relates to the field of blowers for turbomachines, and more particularly to blower nose domes.

TECHNOLOGICAL BACKGROUND OF THE INVENTION

The nose dome of a turbomachine enables a part of the stream of air that enters the interior of the turbomachine to be deflected toward the blower blades, this stream of air subsequently being separated into a primary stream, which passes through an intake orifice of the compressor, and a secondary stream, which flows around the compressor and is subsequently mixed with the primary stream and/or supplies the cooling circuits for the turbomachine.

The nose dome is mounted on the upstream extremity of the turbomachine shaft, to which the blower blades are attached.

These days, the conventional blower nose dome technology is such that special orifices must be provided at the base of the dome in addition to the holes provided for securing the dome on the turbomachine shaft, the sole purpose of said orifices being to enable the dome to be removed, for example during maintenance of the turbomachine. In fact, due to the conical shape of nose domes it is very difficult if not impossible to remove them without special equipment.

This is why nose domes are furnished with removal means in the form of threaded inserts in which a technician can introduce bolts and remove the dome by screwing the bolts; the bolts being braced against the downstream part of the nose dome.

However, these machining arrangements create additional protruding surfaces for the air stream, which in turn result in aerodynamic losses upstream of the leading edge of the blower blade.

Moreover, the method of removal using bolts is associated with the risk of damaging the downstream part of the dome by marking, scoring or even matting it.

Finally, the use of threaded inserts involves an additional operation of crimping the inserts during the dome manufacturing process and consequently implies increased costs for production and additional supply.

GENERAL DESCRIPTION OF THE INVENTION

In this context, the object of the invention is to suggest a dome for a turbomachine blower that has a conical exterior surface and a base, said dome comprising:
  a plurality of fastening means created by machining said exterior surface, said fastening means comprising:
    a bore that is capable of forming a bearing surface;
    an orifice that passes through said bearing surface and capable of accommodating threaded fastening means;
  a plurality of removal means;

said dome being characterised in that said removal means are created by machining the bores in said fastening means in a direction designed to enable removal in an axial direction of said dome with the aid of a tool that cooperates with said machined arrangements.

One advantage of eliminating the dedicated inserts of the prior art is that the production costs for a part of such kind are lowered, particularly since the supply of inserts is no longer required and the step of installing the inserts on the nose dome is omitted.

Since the removal method using bolts braced against the downstream part of the dome is no longer used, the risks of marking, scoring or otherwise damaging said part are also eliminated.

Since there is no longer any hole provided specifically to enable removal, the aerodynamic surface of the dome is also improved; the protruding surfaces that create turbulence and associated output losses are limited.

The device according to the invention may also include one or more of the features listed below, either singly or in any technically possible combination:
  said dome comprises at least three removal means distributed around the circumference of said dome;
  said removal means are created by bores aligned in an axial direction perpendicular to the axial direction of said orifices of the fastening means;
  said removal means are circular bores.

A further object of the invention is a tool for removing a blower nose dome according to the invention, characterised in that said tool comprises a plurality of rods designed to cooperate with said plurality of said dome removal means.

Said rods advantageously have a circular section that is designed to cooperate with the removal means formed by the circular bores.

The invention will be better understood thanks to the following description and with reference to the figures, which are listed below.

DETAILED DESCRIPTION OF EMBODIMENTS OF THE INVENTION

Figure 1:
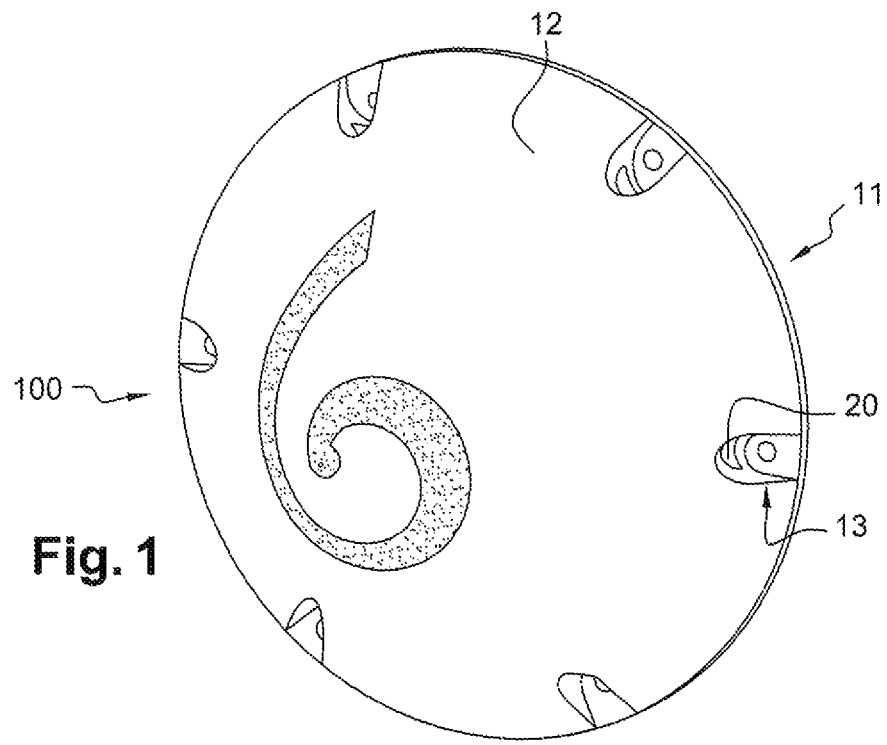
FIG. 1 is a perspective view of a nose dome for a turbomachine blower according to the invention.
Figure 2:
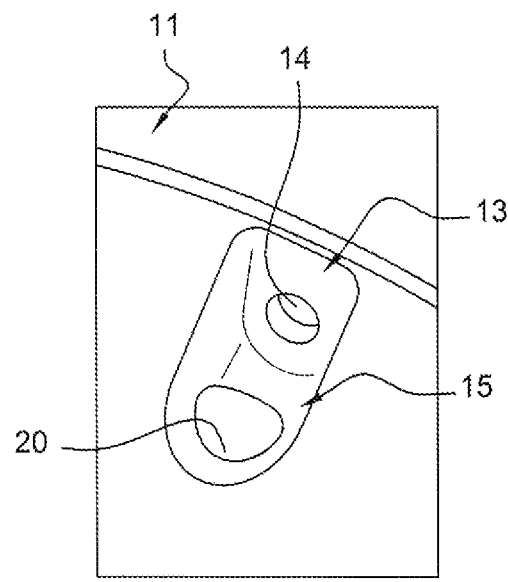
FIG. 2 is a detailed view of the means for removing the nose dome for the blower shown in FIG. 1.

With reference to FIGS. 1 and 2, the nose dome of blower 100 according to the invention conventionally comprises a circular base 11 and a conical exterior surface 12 for receiving a stream of air entering the turbomachine.

The nose dome 100 comprises a plurality of fastening means 13 in the form of perforating orifices 14 aligned perpendicularly to the plane formed by base 11 of the dome and located on the periphery thereof. Fastening means 13 are also furnished with blind bores 15, the diameter of which is larger than the diameter of orifices 14, and which are designed to form a bearing surface for receiving the heads of the threaded fixing means (not shown). In the embodiment shown in FIGS. 1 and 2, bores 15 are substantially perpendicular to base 11.

The nose dome 100 according to the invention also comprises removal means 20 arranged inside bores 15 of fastening means 13.

Removal means 20 are formed by specific machining arrangements, for example blind holes according to the embodiment shown in FIGS. 1 and 2, the axis of rotation of which is substantially perpendicular to the axis of rotation of orifices 14.

According to another embodiment of the invention (not shown), removal means 20 that are machined into bores 15 may be shaped variously provided they allow cooperation with a removal tool and enable an axial force to be applied that is sufficient for removal of dome 100.

Nose dome 100 according to the invention comprises at least two removal means 20, and preferably at least three removal means 20 distributed about the circumference of said dome 100.

Figure 3:
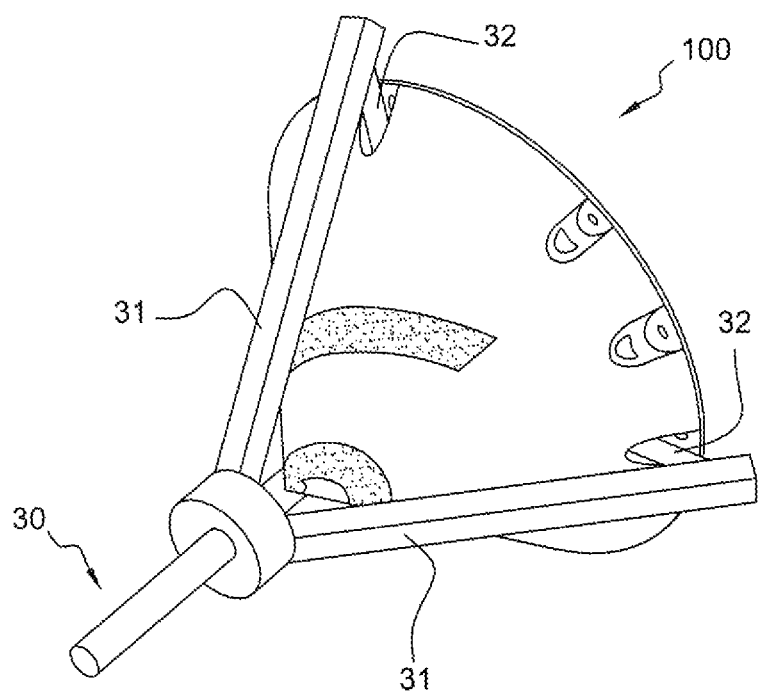
FIG. 3 is a perspective view of an example of the removal equipment designed to enable the removal of the blower nose dome according to the invention.

In this context, FIG. 3 illustrates a removal tool 30 comprising three arms 31, the ends of which are each furnished with a rod 32 designed to cooperate with three removal means 20 arranged in bores 15 of fastening means 13.

Rods 32 are shaped to complement the shape of the machined arrangements in removal means 20.

When rods 32 are inserted in removal means 20, the equipment provides grasping means that allow the application of an axial force sufficient to enable the removal of the nose dome. The bores that form dome removal means 20 are deep enough to create a contact zone between rods 32 and dome 100 that is large enough to enable the dome to be removed without damaging it.

The invention claimed is:

1. A nose dome for a turbomachine blower having a conical exterior surface and a base, said dome comprising:
   a plurality of fasteners created by machining said exterior surface, each of said fasteners including:
   a first blind bore configured to provide a bearing surface;
   an orifice that passes through said bearing surface and which is able to accommodate a threaded fastener;
   a plurality of removal mechanisms, each of said removal mechanisms created by machining a portion of the first blind bore in a corresponding fastener in a direction allowing removal in an axial direction of said dome with the aid of a tool that is configured to cooperate with said machined portion.

2. The nose dome of a turbomachine blower according to claim 1, comprising at least three removal mechanisms distributed around the circumference of said dome.

3. The nose dome of a turbomachine blower according to claim 1, wherein each of said removal mechanisms is created by a bore aligned in an axial direction perpendicular to the axial direction of said orifice of a corresponding fastener.

4. The nose dome of a turbomachine blower according to claim 1, wherein said removal mechanisms are circular bores.

5. A tool for removing a blower nose dome according to claim 1, comprising a plurality of rods configured to cooperate with said plurality of said removal mechanisms for said dome.

6. The tool for removing a blower nose dome according to claim 5, wherein said rods have a circular section that is configured to cooperate with the removal mechanisms formed by circular bores.

* * * * *